United States Patent [19]

Flint

[11] 4,027,154
[45] May 31, 1977

[54] ELECTRONIC DOCUMENT DETECTOR CIRCUITRY WITH FEEDBACK CONTROL

[75] Inventor: John R. Flint, Barrington, Ill.

[73] Assignee: Bell & Howell Company, Chicago, Ill.

[22] Filed: Dec. 29, 1975

[21] Appl. No.: 644,798

[52] U.S. Cl. .................. 250/214 AG; 250/557; 250/222 PC
[51] Int. Cl.² .................. H01J 39/12; G06K 15/00
[58] Field of Search .......... 250/556, 555, 566, 567, 250/568, 569, 561, 222 R, 222 PC, 214 AG; 235/61.11 E

[56] References Cited

UNITED STATES PATENTS

| 3,660,670 | 5/1972 | Howard | 250/222 PC |
| 3,789,215 | 1/1974 | Penny | 250/555 |

Primary Examiner—Alfred E. Smith
Assistant Examiner—David K. Moore
Attorney, Agent, or Firm—Robert A. Walsh

[57] ABSTRACT

The disclosure relates to an electronic document detector particularly adapted for but not limited to use in a document recording system. The document detector comprises a light source, a current source which includes a light sensitive element spaced from the light source and arranged for receiving at least a portion of the light output of the light source for providing a current having a magnitude directly related to the amount of light received by the element, wherein the space between the light source and the light sensitive element defines a path in which documents to be detected traverse. As each document traverses the path, the light sensitive element is shielded from the light source. A current sink coupled to the current source has an input and an output for providing at its output an intermediate control voltage having a magnitude related to the magnitude of the current provided by the current source and within a first range below a given level and within a second range above the given level. A voltage detector coupled to the output of the current sink provides a document indicative signal when the intermediate control voltage falls below the given level into the first range. An intermediate control voltage restoring means coupled between the current sink output and the current sink input restores the intermediate control voltage to a predetermined level within the second range after each document traverses the path.

10 Claims, 1 Drawing Figure

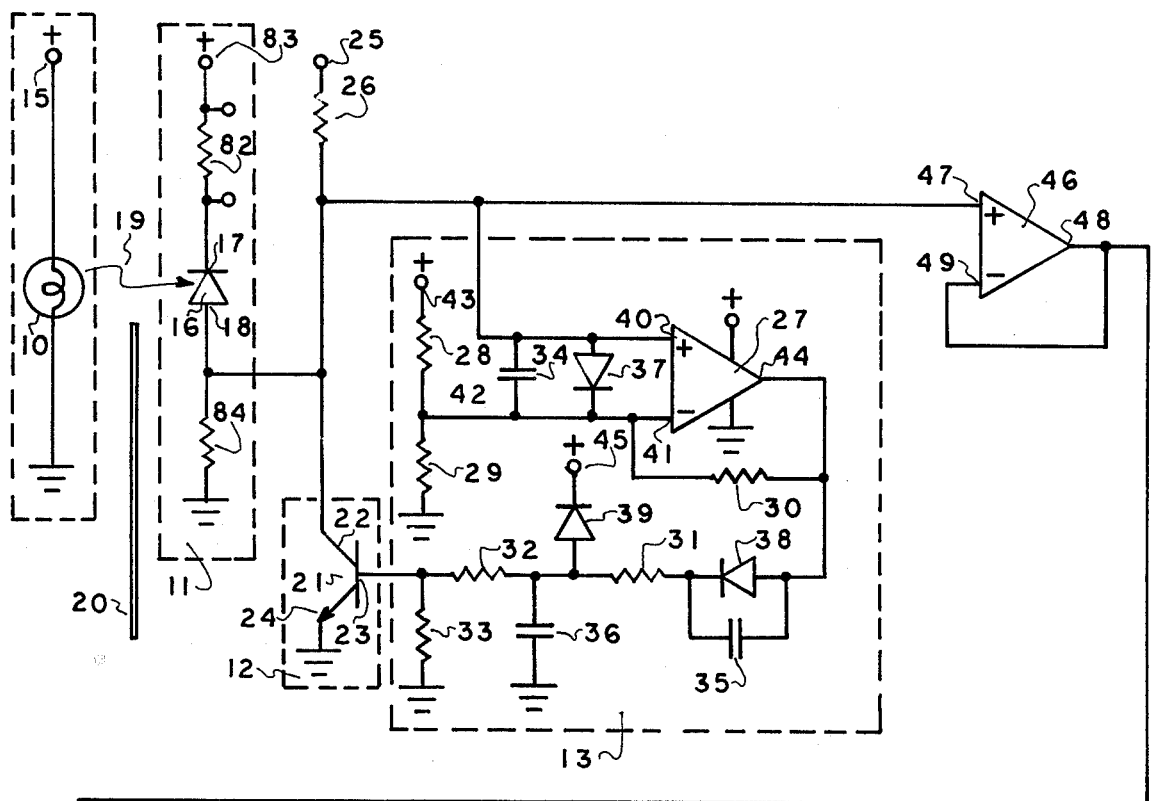
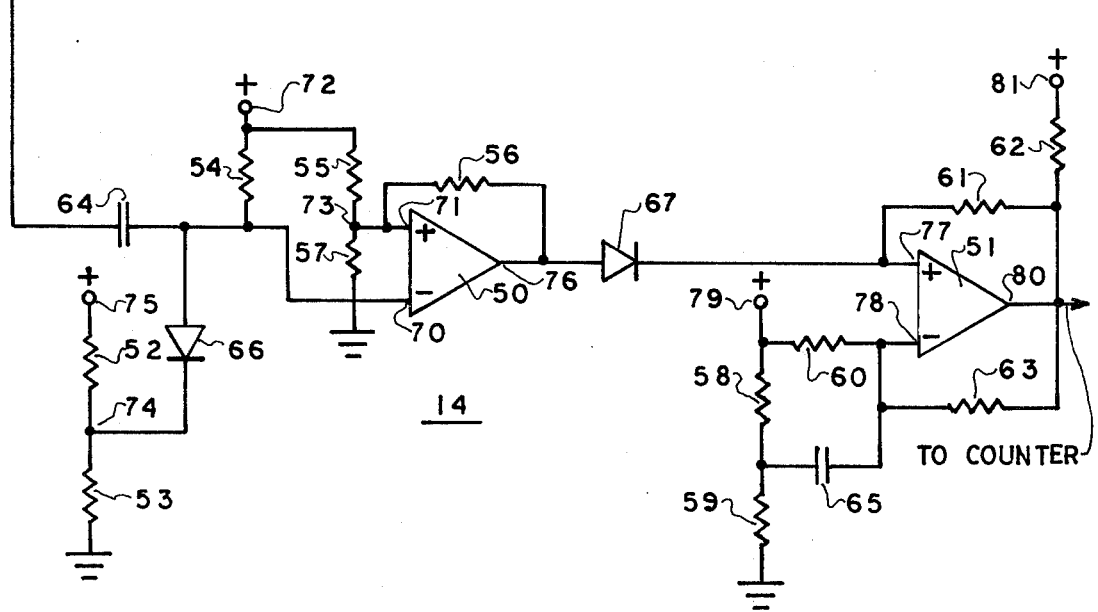

ELECTRONIC DOCUMENT DETECTOR CIRCUITRY WITH FEEDBACK CONTROL

BACKGROUND OF THE INVENTION

The present invention is generally directed to an electronic document detector and in particular to an electronic document detector for use in a document recorder or similar environments.

Document recorders are well known in the art and find considerable use in applications where it is desirable to make a permanent record of a series of documents on microfilm. For example, such a device finds considerable use in banking systems wherein cancelled checks are permanently recorded on microfilm. While making the permanent record of the checks on microfilm, it is desirable to be able to count each document so that the total number of documents recorded may be obtained. In providing this function document recorders have generally included document detecting systems which detect the presence of each document as they enter the recording device.

While document detecting systems of the prior art have been successful to some degree, they have suffered from a number of deficiencies. First, many document detectors include a light source and a photocell having a relatively small light detecting area. With the growing popularity of computers, and particularly computer processing of checks, many checks which are to be recorded will include areas having a number of computer punch holes in them. The individual computer punch holes are on the same order of magnitude in dimensions as the effective light detecting area of the photocells and thus a document having such computer punch holes may cause a document detecting system of the prior art to detect and count the same document twice. This problem may also occur when a document to be detected has binder holes along its margin.

Another problem has been that through age, the light sources will experience a degradation in their light output and thus upset the required voltage or current transitions which must take place in order for the document detecting systems to operate properly. In addition, such systems also will accumulate dirt on the light sources and various other system elements. The accumulation of dirt will have the same effect on the system as the light output degredation of the light sources.

It is therefore a general object of the present invention to provide a new and improved electronic document detector.

It is a further object of the present invention to provide an electronic document detector with increased dynamic range to thereby obtain the necessary current and voltage transitions required for proper functioning not withstanding aging of the detector or the accumulation of dirt within the detector.

It is a still further object of the present invention to provide a new and improved electronic document detector which is capable of properly identifying documents having punched holes to thereby maintain a high degree of accuracy and integrity in the document detection.

SUMMARY OF THE INVENTION

The invention provides an electronic document detector comprising a light source, a current source including a light sensitive element spaced from the light source and arranged for receiving at least a portion of the light output of the light source for providing a current having a magnitude directly related to the amount of light received over a specific area of the element, the space between the light source and the element defining a path in which documents to be detected traverse, whereby as each document traverses the path the element is shielded from the light source. The document detector of the present invention further includes a current sink coupled to the current source having an input and an output for providing at the output which is at the common junction of the source and sink, an intermediate control voltage having a magnitude related to the magnitude of the current provided by the current source and within a first range below a given level in the presence of a document within the path and within a second range above the given level in the absence of a document from the path, a voltage detector coupled to the output of the current sink for providing a document indicative signal when the intermediate control voltage falls below the given level into the first range, an intermediate control voltage restoring means coupled to the current sink output and the current sink input for restoring the intermediate control voltage to a predetermined level within the second range after each document traverses the path. As a result, with the intermediate control voltage restoring means restoring the intermediate control voltage to the predetermined level within the second range after each document traverses the path, the current sink is reset for operation between documents to a level which assures proper intermediate control voltage transitions between the second range and the first range not withstanding long term variations in light output levels of the light source due to aging of the light source or the collection of dirt on the light source.

BRIEF DESCRIPTION OF THE DRAWING

The invention, together with the objects and advantages thereof, may best be understood by reference to the following description taken in conjunction with the accompanying drawing, and in the sole FIGURE in which like reference numerals identify like elements and in which the sole FIGURE is a schematic circuit diagram of an electronic document detector embodying the present invention.

DESCRIPTION OF THE PREFERRED EMBODIMENT

Referring now to the sole FIGURE, the electronic document detector thereshown in schematic form comprises a light source 10, a current source 11, a current sink 12, an intermediate control voltage restoring means 13 and a voltage detector 14.

Light source 10 is connected to a suitable power source at terminal 15 and to ground potential to cause light source 10 to illuminate and provide a short term stable light output. The current source 11 includes a light sensitive element comprising a photo electric device or photodiode 16 and resistors 82 and 84. Photodiode 16 is of the type having a rather large base junction with an effective light sensitive area of approximately one centimeter by two centimeters in dimension. It has been found to be advantageous to mask down the effective light sensitive area of the photodiode to a dimension of approximately one-sixteenth by five-eighths of an inch to assure that the diode effective sensing area will be fully illuminated even in the presence of slight mechanical vibrations to the light source. The masked down area may also be referred to as a specific area of the photodiode. Photodiode 16 has a cathode 17 coupled to a positive power source terminal 83 by resistor 82 and an anode 18 coupled to ground through resistor 84. Thus, photodiode 16 is back biased and will provide a current having a magnitude which is directly related to the amount of light which it receives over its specific area. Diode 16 is spaced from the light source 10 and arranged for receiving at least a portion of the light source output for providing the current source current. The space 19 in between light source 10 and diode 16 defines a path in which documents to be detected traverse, whereby as each document traverses the path, diode 16 is shielded from light source 10. A representative document is shown at 20 prior to traversing path 19.

Current sink 12 comprises transistor 21 having a collector 22, a base 23 and an emitter 24. Collector 22 constitutes the output of the current sink, base 23 constitutes the input of the current sink, and emitter 24 is coupled to ground. Collector 22 of transistor 21 is coupled to a positive voltage source terminal 25 by resistor 26. Collector 22 is also coupled to the current sink at collector 22 provides an intermediate control voltage which is related to the magnitude of the current provided by the current source and within a first range below a given level in the presence of a document within the path shielding the photodiode 16 from light source 10, and within a second range above the given level in the absence of a document from the path 19.

The intermediate control voltage restoring means 13 comprises a negative feedback arrangement coupled between collector 22 of transistor 21 and base 23 of transistor 21. It includes a comparator 27, resistors 28 through 33, capacitors 34 through 36, and diodes 37 through 39. Comparator 27 has an input 40 coupled to collector 22 of current sink transistor 21 and to anode 18 of photodiode 16 and another input 41 coupled to a resistor divider comprising resistors 28 and 29 at their common junction 42. Resistor 28 is coupled to a positive power source terminal 43 and resistor 29 is coupled to ground. The values of resistors 28 and 29 are selected to provide at junction 42 and thus at input 41 of comparator 27 a reference voltage which is equal to a predetermined level within the second range. Capacitor 34 and diode 37 are coupled across inputs 40 and 41 of comparator 27 and resistor 30 is coupled between output 44 and input 41 of comparator 27. Output 44 of comparator 27 is also coupled to diode 38 and capacitor 35 which are in turn coupled to capacitor 36 through resistor 31. Diode 39 is coupled between the common junction of resistor 31 and capacitor 36 to a positive power source terminal 45. The common junction of resistor 31 and capacitor 36 is also coupled to base 23 of transistor 21 by resistor 32 and resistor 33 is coupled from base 23 to ground.

The intermediate control voltage restoring means restores the intermediate control voltage generated at collector 22 of transistor 21 to the predetermined level after each document traverses path 19. For this preferred embodiment, the predetermined level is chosen to be 3 volts. With terminal 41 being coupled to the reference voltage and terminal 40 being coupled to the output of the current sink, the intermediate control voltage restoring means constitutes a negative feedback arrangement to provide at output 44 a restoration voltage for restoring the intermediate control voltage to the predetermined level and which is related to the differential magnitude of the intermediate control voltage and a reference voltage at junction 42. When collector 22 is above the predetermined level of three volts, input 40 will be more positive than input 41 and will cause output 44 to provide a high level which charges capacitor 36 to drive transistor 21 harder to pull collector 22 down to three volts. When collector 22 is below 3 volts, input 40 will be less positive than input 41 thus resulting in a low voltage at output 44 which causes capacitor 36 to discharge and eventually decrease the drive on base 23 to the point where collector 22 falls back to three volts. The values of resistors 31, 32 and 33 are chosen so that capacitor 36 has a short charging time or in other words a short charging time constant and a relatively long discharging time or discharging time constant. Thus the value of resistor 31 is small as compared to the resistance of resistors 32 and 33. The reason for having capacitor 36 charge rapidly is so that the intermediate control voltage will be restored to the predetermined level of three volts immediately after a document traverses path 19 in between light source 10 and photodiode 18. A long discharging time constant for capacitor 36 is selected so that the intermediate control voltage at collector 22 will be held low within the first range for the entire length of the document as it traverses path 19.

Diode 37 is coupled across input 40 and 41 of comparator 27 to preclude the comparator from being saturated and capacitor 34 is provided across input 40 and 41 to provide stability. Diode 38 is provided at the output 44 of comparator 27 to preclude the output 44 from discharging capacitor 36 when it obtains its low state and diode 39 is provided between the common junction of resistor 31 and capacitor 36 for discharging capacitor 36 when the document detector is turned off.

The voltage detector 14 is coupled to the current sink output at collector 22 by a unity gain amplifier 46. Unity gain amplifier 46 has an input 47 coupled to collector 22 of transistor 21, to anode 18 of photodiode 16 and to input 40 of comparator 47. Unity gain amplifier 46 also has an output 48 and another input 49 which are coupled together in a well known manner. Unity gain amplifier 46 comprises an impedance matching means for matching the impedance at input 47 to the input impedance of the voltage detector 14 as seen at output 48.

The voltage detector 14 comprises comparator 50, resistors 52 through 57, capacitor 64, diodes 66 and 67, and a one-shot multivibrator comprising comparator 51, resistors 58 through 63, and capacitor 65.

Comparator 50 has an input 70 coupled to the output 48 of unity gain amplifier 46 by capacitor 64 for receiving the intermediate control voltage at its input 70. Comparator 50 has another input 71 coupled to a voltage divider comprising resistors 55 and 57. Resistor 55 is coupled to a positive power source terminal 72 and resistor 57 is coupled to ground. The values of resistors 55 and 57 are selected to provide at the common junction 73 a reference voltage which is equal to the given voltage level. As will be more fully explained hereinafter, when the intermediate control voltage is in a first range below the given voltage, the voltage detector provides responsive thereto a document indicative signal which indicates the arrival of a document. The document indicative signal may be used to update a counter or to actuate an imprinter for imprinting the document. When the intermediate control voltage is in a second range above the given voltage level, this condition indicates that there is a absence of a document within path 19. The given voltage level selected for this preferred embodiment is 2.5 volts.

Diode 66 is coupled between input 70 of comparator 50 and the common junction 74 of resistors 52 and 53. Resistor 52 is coupled to a positive power source terminal 75 and resistor 53 is coupled to ground. The combination of diode 66 and resistors 52 and 53 serve to recharge capacitor 64 to clamp input 70 of comparator 50 and reset capacitor 64 when there is an absence of a document from within path 19. Resistor 54 is coupled between input 70 of comparator 50 and the positive power source terminal 72 to pull up input 70 when the intermediate control voltage is in the second range above the given level. Resistor 56 is coupled between output 76 of comparator 50 and input 71 of comparator 50 to provide positive feedback in a well known manner.

Comparator 51 has an input 77 coupled to output 76 of comparator 50 by diode 67. Comparator 51 and its associated circuitry forms a one-shot multivibrator and diode 67 maintains input 77 of the one-shot at a high enough level to insure proper operation of the one-shot. In effect, diode 67 isolates input 77 of comparator 51 from output 76 of comparator 50 so that output 76, should it obtain a low logic level during the detection of a document, will not cause a low logic level at input 77 of comparator 51.

Comparator 51 has another input 78 coupled to resistors 60 and 63, and capacitor 65. Resistor 60 is coupled to a positive power source terminal 79 and to resistor 58. Resistor 58 is coupled to ground by resistor 59 and capacitor 65 is coupled to the common junction of resistors 58 and 59. This arrangement establishes at input 78 a reference voltage for use by the one-shot multivibrator and also a means for resetting the one-shot. Resistors 61 and 63 are coupled to the output 80 and to one of the inputs 77 and 88 in a known manner. Output 80 is also coupled to a positive power source terminal 81 by resistor 62. Output 80 provides the document indicative signal which may be used by a counter as indicated or by an imprinter.

In operation, assuming that the document detector of the sole FIGURE has been activated and that no documents have yet traversed path 19 between light source 10 and photodiode 16, the negative feedback arrangement of the intermediate control voltage restoring means 13 establishes collector 22 of current sink 12 at a predetermined level of three volts within the second range above the given voltage level of 2.5 volts. At this time, diode 16 is receiving the maximum amount of available light from light source 10 and is conducting its maximum current. Thus, the intermediate control voltage restoring means adjusts the intermediate control voltage to the light available at diode 16.

When the leading edge of document 20 traverses path 19 and shields photodiode 16 from light source 10, the current supplied by photodiode 16 and thus current source 11 is drastically reduced which causes the voltage level at collector 22 of current sink transistor 21 to approach zero. Thus, the intermediate control voltage decreases from the predetermined level of 3 volts to approximately zero which is detected by voltage detector 14. Voltage detector 14 receives at input 70 of comparator 50 the intermediate control voltage which is now approximately zero and compares this voltage against the given level of 2.5 volts which is impressed upon input 71. Because input 71 is now more positive than input 70, comparator 50 will provide at output 76 a high level which is transferred to input 77 of comparator 51. Input 77 will likewise be more positive than input 78 so that comparator 51 will provide at output 80 a high level constituting the document indicative signal to be translated to the counter for updating the counter.

While the document is traversing path 19, the intermediate control voltage is held down over the entire length of the document within the first range and below the given level because capacitor 36 provides discharge current drive to base 23 of transistor 21. When the end of the document finally traverses path 19 and no longer shields photodiode 16 from light source 10, photodiode 16 once again conducts current. Because capacitor 36 is at least partially discharged, the collector 22 of transistor 21 will rise to a level above the predetermined level of 3 volts. When this happens, the negative feedback arrangement of the intermediate control voltage restoring means causes capacitor 36 to be quickly charged to drive base 23 harder to reduce the voltage at collector 22 to the predetermined level of three volts in the manner as previously explained. Because the value of resistor 31 is selected to provide a fast charging time constant for capacitor 36 relative to the discharging time constant provided by resistors 32 and 33 the intermediate control voltage at collector 22 will be pulled down to the predetermined level within a relatively short period of time. In fact, the intermediate control voltage will be restored to the predetermined level of 3 volts before the next document intercepts path 19 and shields photodiode 16 from light source 10.

Now, the light source and photodiode 16 are in between documents, and the intermediate control voltage is restored to the predetermined level of three volts which is in the second range above the given level. Input 71 of comparator 50 will be less positive than input 70 and thus will provide a low level at output 76. Capacitor 65 and its associated resistors 60, 58 and 59 will reset the one-shot multivibrator comprising comparator 51 for acting upon the next document.

If a document has computer punch holes or binder holes and intercepts path 19 between light source 10 and diode 16, photodiode 16 will be caused to conduct current but not its maximum current. This results because photodiode 16 comprises a light sensitive area detector which has a masked base junction or specific sensing area of approximately one-sixteenth inch by five-eighths inch in dimension. Because the effective light sensitive area of photodiode 16 is much greater than the individual computer punch holes, photodiode 16 will not provide enough current to cause the intermediate control voltage at collector 22 of transistor 21 to rise above the given level into the second range. Thus, photodiode 16 provides a current to the current sink 12 having a magnitude which will cause the current sink to provide the intermediate control voltage having a magnitude within the first range below the given level not withstanding a document traversing path 19 having a plurality of individual light transmissive areas which are small relative to the effective area of detection of photodiode 16. In this manner, the document detector of the present invention is impervious to computer punched holes within documents and thus, the integrity and accuracy of the document detector is assured.

With an inclusion of the intermediate control voltage restoring means 13 and, in particular the negative feedback arrangement the intermediate control voltage is restored to a predetermined level wihin the second range in between documents to thereby adjust the detector to the light available to diode 16 and assure proper voltage and current transistions during the detection of each document. Should the light source age or should dirt collect on the light source 10 or glass surfaces which may lie in between light source 10 and photodiode 16, because comparator 27 is not satisfied until the intermediate control voltage is at the predetermined level, it is assured that the intermediate control voltage is restored to the predetermined level not withstanding the aforementioned effects on the system with the passing of time.

While a particular embodiment of the invention has been shown and described, modifications may be made, and it is intended in the appended claims to cover all such modifications as may fall within the true spirit and scope of the invention.

I claim:
1. An electronic document detector comprising:
   a light source;
   a current source including a light sensitive element spaced from said light source and arranged for receiving at least a portion of the light output of said light source for providing a current having a magnitude directly relative to the amount of light received by said element, the space between said light source and said element defining a path in which documents to be detected traverse, whereby as each document traverses said path said element is shielded from said light source;
   a current sink coupled to said current source having an input and an output for providing at said output an intermediate control voltage having a magnitude related to the magnitude of the current provided by said current source and within a first range below a given level in the presence of a document within said path and within a second range above said given level in the absence of a document from said path;
   a voltage detector coupled to said output of said current sink for providing a document indicative signal when said intermediate control voltage falls below said given level into said first range; and
   intermediate control voltage restoring means coupled between said current sink output and said current sink input for restoring said intermediate control voltage to a predetermined level within said second range after each document traverses said path; whereby,
   with said intermediate control voltage restoring means restoring said intermediate control voltage to said predetermined level within said second range after each document traverses said path, said current sink is reset for operation between documents to a level which assures proper intermediate control voltage transitions between said second range and said first range not withstanding variations in light output levels of said light source due to aging of said light source or the collection of dirt on said light source.

2. A document detector in accordance with claim 1 wherein said light sensitive element comprises a light area detector for providing a current to said current sink of a magnitude to cause said current sink to provide said intermediate control voltage having a magnitude within said first range not withstanding a document traversing said path having a plurality of individual light transmissive areas which are small relative to the effective area of detection of said light sensitive element.

3. A document detector in accordance with claim 2 wherein said light sensitive element comprises a photodiode and means for back biasing said photodiode.

4. A document detector in accordance with claim 3 wherein said effective light area of detection of said photodiode is approximately one-sixteenth inch by five-eighths inch in dimension.

5. A document detector in accordance with claim 1 wherein said intermediate control voltage restoring means comprises a negative feedback arrangement for acting upon said current sink and restoring said intermediate control voltage to said predetermined level and maintaining said intermediate control voltage constant at said predetermined level in the absence of a document from said path.

6. A document detector in accordance with claim 5 wherein said current sink comprises a transistor having a collector, a base and an emitter, wherein said collector comprises said current sink output, said base comprises said current sink input, and said emitter is coupled to a reference potential, and wherein said negative feedback arrangement is coupled between said collector and said base.

7. A document detector in accordance with claim 6 wherein said negative feedback arrangement comprises a comparator having a first input coupled to said collector, a second input coupled to a reference source having a magnitude equal to said predetermined level, and an output for providing an intermediate restoration voltage which is inversely related to the magnitude of said intermediate control voltage.

8. A document detector in accordance with claim 7 wherein said output of said comparator is coupled to said base by a charging circuit having a fast charging time constant and a relatively long discharging time constant for rapidly restoring said intermediate control voltage to said predetermined level and for driving said base with discharge current for holding said intermediate control voltage within said first range for the duration of the entire length of each document or each document traverses said path.

9. A document detector in accordance with claim 1 wherein said voltage detector comprises a voltage comparator having a first input coupled to a reference voltage having a magnitude equal to said given level, a second input coupled to said current sink for receiving said intermediate control voltage and an output for providing said document indicative signal when said intermediate control voltage falls below said given level into said first range.

10. An electronic document detector comprising:
    a light source;
    a current source including a light sensitive area detector spaced from said light source and arranged for receiving at least a portion of the light output of said light source for providing a current having a magnitude directly related to the amount of light received by said light detector, the space between said light source and said light detector defining a path in which documents to be detected traverse, whereby as each document traverses said path said light detector is shielded from said light source;

a current sink coupled to said current source having an input and an output for providing at said output an intermediate control voltage having a magnitude related to the magnitude of the current provided by said current source and within a first range below a given level in the presence of a document within said path and within a second range above said given level in the absence of a document from said path;

a voltage detector coupled to said output of said current sink for providing a document indicative signal when said intermediate control voltage falls below said given level into said first range; and intermediate control voltage restoring means comprising a negative feedback arrangement coupled between said current sink output and said current sink input for providing a restoration control voltage which is inversely related to the magnitude of the intermediate control voltage to thereby restore said intermediate control voltage to a predetermined level within said second range and to maintain said predetermined level constant after each document traverses said path.

* * * * *